United States Patent Office 3,535,348
Patented Oct. 20, 1970

3,535,348
3-OXIMES OF 17(20)-EN-21-OIC ACIDS OF THE PREGNANE SERIES
Robert W. Jackson, Portage, and John C. Babcock, Kalamazoo, Mich., assignors to The Upjohn Company, Kalamazoo, Mich., a corporation of Delaware
No Drawing. Filed July 31, 1967, Ser. No. 657,073
Int. Cl. C07c 167/00
U.S. Cl. 260—397.1                                        1 Claim

ABSTRACT OF THE DISCLOSURE

This invention relates to novel 3-oximes and more particularly to those compounds embraced by the formula

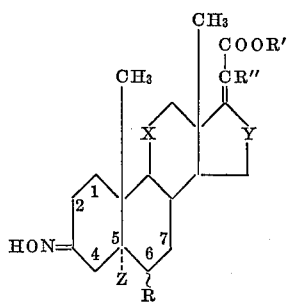

wherein the 1(2)-, 4(5)- and 6(7)-carbon atom linkages are selected from the group consisting of single bonds and double bonds; ~ is a generic expression denoting α- and β-bonds and mixtures thereof; X and Y are selected from the group consisting of the methylene radical

the α-hydroxymethylene radical

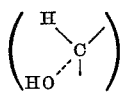

the β-hydroxymethylene radical

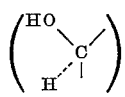

and the carbonyl radical

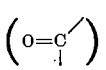

Z is selected from the group consisting of hydrogen and hydroxy, with the proviso that Z is absent when the 4(5)-carbon atom linkage is a double bond; R is selected from the group consisting of hydrogen, methyl and fluorine, with the proviso that when R is selected from the group consisting of methyl and fluorine, the stereoconfiguration at $C_6$ is β- when Z is hydroxy and selected from the group consisting of α- and β- when the 4(5)-carbon atom linkage is a double bond and R is without stereoconfiguration at $C_6$ when the 6,7-carbon atom linkage is a double bond; R' is selected from the group consisting of hydrogen and lower alkyl or from one through twelve carbon atoms; R'' is hydrogen and when Y is selected from the group consisting of the α-hydroxymethylene, β-hydroxymethylene and carbonyl radicals, R'' is additionally methyl. The compounds embraced by the above formula possess anti-inflammatory, anti-viral, anti-microbial, anti-allergic and anti-anaphylactic activities.

BRIEF SUMMARY OF THE INVENTION

The novel compounds of this invention and a process for their production are represented by the following formulae:

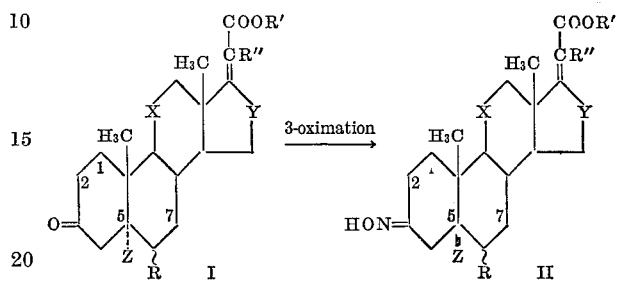

wherein 1(2)-, 4(5)-, 6(7)-, ~, X, Y, Z, R, R' and R'' have the same meaning as above.

The compounds of this invention (II) occur in their 3-syn form, 3-anti form and as mixtures of these two isomers. Illustratively, the 3-oximes of 3,11-dioxo-4,17(20)-cis-pregnadien-21-oic acid, methyl ester (II) have the following configurations:

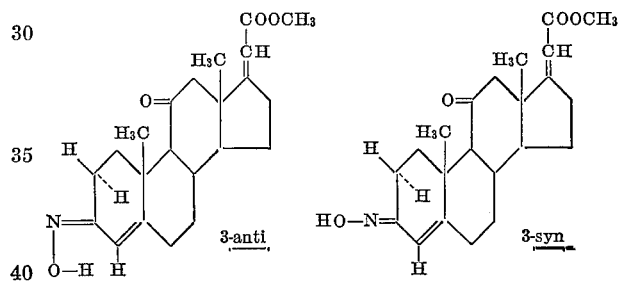

In this specification and claims, the term HON= when attached to the 3-carbon atom of the steroid nucleus denotes the 3-anti form, the 3-syn form and mixtures thereof.

In this application, unless specifically designated as cis or trans, the COOR' group attached to the double bonded C-20 carbon atom of the compounds of Formulae I and II, above, includes both the cis and trans configuration and/or mixtures thereof.

The 3-oxime compounds (II) of the present invention are prepared from their corresponding 3-keto compounds (I) by 3-oximation, e.g., by reaction with hydroxylamine or hydroxylamine mineral acid salts such as hydroxylamine hydrochloride.

The process of the present invention comprises treating a compound selected from one of the above-selected 3-keto starting materials (I) with a mineral acid salt of hydroxylamine such as hydroxylamine hydrochloride or hydroxylamine sulfate in a suitable solvent such as (1) an alkanol, for example, methanol, ethanol, propanol, isopropanol, butanol or (2) a tertiary amine, for example, pyridine, collidine, N,N-dimethylaniline and the like, or preferably (3) an alcohol in the presence of a basic reagent such as a tertiary amine, sodium or potassium hydroxides, carbonates or acetates, to give the corresponding 3-oxime (II). In carrying out this 3-oximation process, an excess of hydroxylamine salt, usually from two to six molar equivalents is preferably employed. Alternatively, hydroxylamine itself can be used in place of the hydroxylamine salt and base.

The 3-oximation reaction is preferably carried out at 20 to 120° C., conveniently at room temperature and as high as the reflux temperature of the reaction mixture. Under these conditions, the reaction time is usually from 15 minutes to 8 hours. Both higher and lower temperatures and shorter and longer reaction times are operative, the lower temperature usually requiring a correspondingly longer reaction time.

The starting compounds of Formula I wherein the 4(5)-carbon atom linkage is a double bond, are converted to their $\Delta^1$-, $\Delta^6$- and $\Delta^{1,6}$-counterparts in accordance with procedures well known in the art. The $\Delta^1$-derivatives of Formula I are produced by 1,2-dehydrogenation with selenium dioxide in the manner disclosed in U.S. Pat. 2,971,886 and by 2,3-dichloro-5,6-dicyanobenzoquinone (DDB) as in British Pat. 852,847; e.g., by these procedures an alkyl 3,11-diketo 4,17(20)-cis-pregnadien-21-oate and the corresponding 11$\beta$-hydroxy compound are converted to their respective 1,4,17(20)-cis-pregnatrienes (I). The $\Delta^4$-compounds embraced by Formula I when reacted with tetrachloro-p-benzoquinone (chloranil) in the manner described in J. Amer. Chem. Soc. 79, 1257, yield their corresponding $\Delta^{4,6}$-derivatives e.g., alkyl 3,11-diketo - 4,6,17(20) - cis - pregnatrien - 21 - oates and alkyl 3-keto-11$\beta$ hydroxy - 4,6,17(20) - cis - pregnatrien-21-oates. The $\Delta^{4,6}$-compounds (I) can be dehydrogenated at the 1(2)-position with selenium dioxide to give the corresponding $\Delta^{1,4,6}$-compounds, e.g., alkyl 3-keto-1,4,6,17(20)-cis-pregnatetraen-21-oates and alkyl 3-keto-11$\beta$ hydroxy - 1,4,6,17(20) - cis - pregnatetraen - 21 - oates. The $\Delta^{1,4,6}$-compounds (I) can preferably be prepared by the 6-dehydrogenation of the corresponding $\Delta^{1,4}$-compounds (I) by reaction with chloranil. The $\Delta^{1,4,6}$-compounds (I) can also be prepared directly from the $\Delta^4$-compounds of Formulae I and II, respectively, by reaction with chloranil at elevated temperatures in accordance with the method also set forth in J. Amer. Chem. Soc. 79, 1257.

The starting compounds embraced by Formula I wherein the 1(2)- and 4(5)-carbon atom linkages are single bonds, can be converted to their $\Delta^{1,4}$-counterparts by reaction with DDQ.

The 21-oic acid alkyl esters embraced by Formula I can be converted to their corresponding 21-oic acids by hydrolysis, e.g., as in Example 1 of U.S. Pat. 3,162,631.

All of the compounds included within Formula II of the flowsheet, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The mixtures of syn and anti isomers obtained in the above-disclosed process or by equilibration of these products, can be separated by procedures known in the art for isolating components of mixtures of geometrical isomers, for example, by fractional crystallization, chromatography, selective leaching, or a combination of these methods.

Starting materials (I) employed in the process for preparing the novel 3-oximes (II) of the present invention include the known Favorskii esters unsubstituted at the 16- and 20-positions disclosed in U.S. Pat. 3,281,415; those substituted at C-16 and unsubstituted at C-20 set forth in U.S. Pat. 3,305,546; those substituted at the 20-position and by keto, $\alpha$-hydroxy or $\beta$-hydroxy at C-16, described in Netherlands patent application No. 6,614,662, filed Oct. 18, 1966.

The compounds embraced by Formula II possess anti-inflammatory, anti-viral, anti-microbial and anti-hormonal activities. They stimulate natural host-defense mechanisms to infectious diseases and virus induced processes. They antagonize the action of prostaglandins, Bradykinin and slow reacting substance (SRS-A), which are released during anaphylaxis, and are consequently useful in protection against allergy, anaphylaxis, emphysema and hay fever, as well as in the treatment of these ailments in veterinary practice. The anti-SRS-A activity of the aforesaid compounds can be assayed by "The Protection of Sensitized Guinea Pigs Against Collapse from Antigen Containing Aerosol Test," a modification of the method described by W. G. Smith, J. Pharm. and Pharmacol 13, 1 (1961). Their anti-Bradykinin activity can be assayed by the method described by Rocha e Silva in Biochem. Pharmacol. 10, 3 (1962).

The compounds of the invention can be prepared and administered to mammals, birds, and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, elixirs or aerosol spray. Either the pure 3-syn or 3-anti isomers or mixtures thereof can be used in such solid and liquid compositions.

DETAILED DESCRIPTION

It is to be understood that the invention is not to be limited to the exact details of operation or exact compositions shown and described herein, as obvious modifications and equivalents will be apparent to one skilled in the art, and the invention is therefore to be limited only by the scope of the appended claims.

EXAMPLE 1

5$\alpha$-hydroxy-6$\beta$-methyl-3,11-dioxo-5$\alpha$-pregn-cis-17(20)-en-21-oic acid, methyl ester, 3-oxime (II)

A solution of 2 g. of 5$\alpha$-hydroxy-6$\beta$-methyl-3,11-dioxo-5$\alpha$-pregn-cis-17(20)-en-21-oic acid methyl ester (I) in 60 ml. of methanol was treated with 1.57 g. of hydroxylamine hydrochloride and 5 ml. of pH 7 buffer solution (Buff AR, Mallinckrodt, comprising 9.1 g. of potassium dihydrogen phosphate and 18.1 g. of disodium hydrogen phosphate per liter of water) and kept for about 48 hours at room temperature. Most of the methanol was removed by vacuum distillation from a flask held on a steam bath. The residue (15 to 20 ml.) was diluted with about 50 ml. of water and the product precipitated. It was filtered and dried under vacuum at about 40° C. to give 2.01 g. of crude product (II). This material was dissolved in 30 ml. of methylene chloride and chromatographed over 140 g. of Florisil (synthetic magnesium silicate), wet packed in Skellysolve B in a 30 mm. x 850 mm. column. The column was eluted with a mixture of 20% acetone in Skellysolve B to remove any starting material (I). The product (II) was eluted with 50 ml. portions of a mixture of 30% acetone in Skellysolve B to give 1.339 g. in a peak of 8 fractions. The fractions were combined and melted at 138 to 140° C.; $\lambda$ max. 222 m$\mu$, $\epsilon$=11,650 (EtOH). This material, 5$\alpha$ - hydroxy - 6$\beta$ - methyl - 3,11 - dioxo-5$\alpha$-pregn-cis-17(20)-en-21-oic acid, methyl ester, 3-oxime was shown to be a mixture of syn and anti isomers by nuclear magnetic resonance (NMR) spectra. Oxime hydroxy absorptions were observed at 9.95$\delta$ and 9.88$\delta$.

*Analysis.*—Calc'd for $C_{23}H_{30}NO_5$ (percent): C, 68.46; H, 8.24; N, 3.47. Found (percent): C, 67,72; H, 8.26; N, 3.29.

The mixture of isomers thus obtained is separated into 3-syn and 3-anti isomers of 5$\alpha$ - hydroxy-6$\beta$-methyl-3,11- dioxo - 5α-pregn-cis-17(20)-en-21-oic acid, methyl ester, 3-oxime, (II) by fractional crystallization from aqueous methanol.

Several recrystallizations of the syn product from hot methanol yield the pure syn isomer. The hot methanol solution( filtrate) is diluted with water to give an amorphous precipitate consisting mostly of 5α - hydroxy-6β-methyl-3,11-dioxo-5α-pregn-cis - 17(20) - en-21-oic acid, methyl ester 3-oxime (II) in the anti form. This material is suspended in methylene chloride and adsorbed on a column of Florisil. The column is then subjected to gradient elution chromatography with mixtures of 10 to 100% acetone in Skellysolve B (hexanes) and the thus obtained eluate evaporated to dryness to give a solid which is crystallized from a mixture of methanol and water to yield light colored crystals of the anti isomer of 5α - hydroxy - 6β - methyl-3,11-dioxo-5α-pregn-cis-17(20)-en-oic acid, methyl ester, 3-oxime (II).

Alternatively, the above-disclosed hot methanol solution (filtrate) consisting mostly of 5α - hydroxy-6β-methyl - 3,11 - dioxo - 5α-pregn-cis-17(20)-en-21-oic acid, methyl ester, 3-oxime (II) in the anti form is isolated and purified by fractional crystallization from hot methanol to yield a product composed entirely of the anti form.

An equilibrium mixture of the syn and anti isomers is produced by dissolving a sample of either the 3-syn or 3-anti isomer, prepared as above, in pyridine (1% solution) or dilute hydrochloric acid in ethanol and allowing the isomer to remain in contact with this solvent for a period of about 40 hours. The solution is diluted with water to precipitate the mixture of isomers. The fact that both isomers are present in appreciable quantities is established by quantitative infrared and nuclear magnetic resonance spectra and optical rotation.

EXAMPLE 2

6β-fluoro-5α,16α-dihydroxy-3,11-dioxo-5α-pregn-cis-17(20)-en-21-oic acid, methyl ester, 3-oxime (II)

A solution of 2 g. of 6β-fluoro-5α,16α-dihydroxy-3,11-dioxo-5α-pregn-cis-17(20)-en-21-oic acid, methyl ester (I) in 60 ml. of methanol was treated with 1.51 g. of hydroxylamine hydrochloride and 5 ml. of pH 7 buffer solution and kept at room temperature for about 48 hours. The reaction was distilled in vacuo from a steam bath until approximately 15 ml. of liquid remained in the flask. The product (II) was precipitated by the addition of 50 ml. of water, filtered and thoroughly washed with water. After drying under vacuum at about 40° C., 150 g. of crude oxide (II) was obtained; this was chromatographed over 110 g. of Florisil wet packed in Skellysolve B in a column 30 mm. x 840 mm. The column was eluted with 10 fractions of 50 ml. each of 30% acetone in Skellysolve B to elute traces of starting material. The product (II) was found in a peak of 10 fractions eluted with 50 ml. portions of 40% acetone in Skellysolve B. The product did not crystallize from methanol/water and was dissolved in methylene chloride and the mixture allowed to evaporate to give an amorphous gel; this was dried to give 350 mg. of 6β - fluoro-5α,16α - dihydroxy-3,11-dioxo-5α-pregn-cis-17(20)-en - 21 - oic acid, methyl ester, 3-oxime (II) having a melting point of 150 to 154° C., λ max. 220 mμ, ε=10,650/EtOH.

*Analysis.*—Calc'd for $C_{22}H_{30}FNO_6$ (percent): C, 62.39; H, 7.14; N, 3.31; F, 4.48. Found (percent): C, 62.64; H, 7.63; N, 3.21; F, 3.86.

The 3-anti form, 3-syn form and equilibrium mixture thereof of the thus produced 6β-fluoro-5α,16α-dihydroxy-3,11-dioxo-5α-pregn-cis-17(20) - en - 21-oic acid, methyl ester, 3-oxime (II) are isolated and purified in the same manner as recited in Example 1 for the 3-anti and syn isomers and equilibrium mixture of the compound (II) prepared therein.

EXAMPLE 3

5α,16α-dihydroxy-6β-methyl-3,11-dioxo-5α-pregn-17-(20)-cis-en-21-oic acid, methyl ester, 3-oxime (II)

A solution of 2 g. of 5α,16α-dihydroxy-6β-methyl-3,11-dioxo-5α-pregn-17(20)-cis-en-21-oic acid, methyl ester, (I) in 60 ml. of methanol was treated with 1.51 g. of hydroxylamine hydrochloride and 5 ml. of pH 7 buffer solution for about 48 hours at room temperature. The reaction mixture was distilled under vacuum from a steam bath until a residue of approximately 20 ml. remained. The mixture was then diluted with about 100 ml. of water and the product slowly crystallized. After cooling the mixture, the solid material was filtered off, washed with water and dried under vacuum to give 1.5 g. of product (II) melting at 150 to 155° C. Thin layer chromatography [employing a silica gel (colloidal silica) plate, developed in 2:1 ethyl acetatecyclohexane, sprayed with phosphoric acid-vanillin reagent and heated] indicated the product to be one compound contaminated with two minor less polar ones. The material was triturated with methylene chloride and the residue again examined by thin layer chromatography. The plate showed but a single spot and this material was then recrystallized from methanol-water to give 0.85 g. of 5α,16α-dihydroxy-6β-methyl-3,11-dioxo-5α-pregn-17(20)-cis-en-21-oic acid, methyl ester, 3-oxime (II), melting at 147 to 152° C., λ max. 220 mμ, ε=10,150/EtOH. The infrared spectra give absorptions at 3380 cm.−1, C=O at 1720, 1695 cm.−1, C=C/C=N at 1665 cm.−1.

*Analysis.*—Calc'd for $C_{23}H_{33}NO_6 \cdot CH_3OH$ (percent): C, 63.82; H, 8.25; N, 3.10. Found (percent): C, 64.08; H, 7.99; N, 3.44.

The thus produced compound is converted to the unsolvated compound by heating at between about 100° C. to about 120° C. under high vacuum.

The 3-anti form, 3-syn form and equilibrium mixture thereof of the thus produced 5α,16α-dihydroxy-6β-methyl-3,11-dioxo-5α-pregn-17(20)-cis-en - 21 - oic acid, methyl ester, 3-oxime (II) are isolated and purified as recited in Example 1 for the aforesaid forms of the compound (II) prepared therein.

EXAMPLE 4

5α,16β-dihydroxy-6β-methyl-3,11-dioxo-5α-pregn-cis-17-(20)-ene-20-carboxylic acid, methyl ester, 3-oxime (II)

A solution of 1 g. of 5α,16β-dihydroxy-6β-methyl-3,11-dioxo-5α-pregn-17(20)-en-cis-20 - carboxylic acid, methyl ester (I) in 30 ml. of methanol was dissolved in 30 ml. of methanol and treated with 0.75 g. of hydroxylamine hydrochloride and 5 ml. of pH 7 buffer solution at room temperature for about 5 days. Most of the methanol was removed by vacuum distillation from a steam bath. The residue, having a volume of about 15 ml., was diluted with about 50 ml. of water and the product precipitated. This material was filtered, washed thoroughly with deionized water and dried in vacuo to constant weight at about 40° C. The crude product, weighing 780 mg., was chromatographed in a 30 mm. x 850 mm. column of 60 g. of Florisil wet packed in Skellysolve B. After eluting traces of starting material (I) with 25 ml. portions of 30% acetone in Skellysolve B, the product (II) was eluted with 40% acetone in Skellysolve B. A peak of A fractions weighing 525 mg. was combined and triturated with 50 ml. of ether to give 485 mg. of 5α,16β-dihydroxy-6β-methyl-3,11-dioxo-5α-pregn-cis-17(20)-ene-20 - carboxylic acid, methyl ester, 3-oxime (II) having a melting point of 197 to 202° C. This product was shown to be a mixture of the syn and anti isomers as oxime hydroxyl absorptions were present at both 9.87δ and 9.79δ in the NMR spectra.

*Analysis.*—Calc'd for $C_{24}H_{35}NO_6$ (percent): C, 66.50; H, 8.14; N, 3.24. Found (percent): C, 66.31; H, 8.27; N, 3.02.

The mixture of isomers thus obtained is separated into 3-syn and 3-anti isomers of 5α,16β-dihydroxy-6β-methyl- 3,11-dioxo-5α-pregn-cis-17(20)-ene - 20 - carboxylic acid, methyl ester, 3-oxime (II) by fractional crystallization from aqueous methanol.

Several recrystallizations of the syn product from hot methanol yield the pure syn isomer. The hot methanol solution (filtrate) is diluted with water to give an amorphous precipitate consisting mostly of 5α,16β-dihydroxy-6β-methyl-3,11-dioxo-5α-pregn - cis - 17(20) - ene-20-carboxylic acid, methyl ester, 3-oxime (II) in the anti form. This material is suspended in methylene chloride and adsorbed on a column of Florisil. The column is then subjected to gradient elution chromatography with mixtures of 10 to 100% acetone in Skellysolve B and the thus obtained eluate evaporated to dryness to give a solid which is crystallized from a mixture of methanol and water to yield light colored crystals of the anti isomer of 5α,16β-dihydroxy-6β-methyl-3,11-dioxo-5α-pregn-cis - 17(20)-ene-20-carboxylic acid, methyl ester, 3-oxime (II).

Alternatively, the above-disclosed hot methanol solution (filtrate) consisting mostly of 5α,16β-dihydroxy-6β-methyl-3,11-dioxo-5α-pregn-cis-17(20)-ene-20 - carboxylic acid, methyl ester, 3-oxime (II) in the anti form is isolated and purified by fractional crystallization from hot methanol to yield a product composed entirely of the anti form.

An equilibrium mixture of the syn and anti isomers is produced by dissolving a sample of either the 3-syn or 3-anti isomer, prepared as above, in pyridine (1% solution) or dilute hydrochloric acid in ethanol and allowing the isomer to remain in contact with this solvent for a period of about 40 hours. The solution is diluted with water to precipitate the mixture of isomers. The fact that both isomers are present in appreciable quantities is established by quantitative infrared and nuclear magnetic resonance spectra and optical rotation.

EXAMPLE 5

6α-methyl-3,11-dioxo-4,17(20)-cis-pregnadien-21-oic acid, methyl ester, 3-oxime (II)

A solution of 2.5 g. of 6α-methyl-3,11-dioxo-4,17(20)-cis-pregnadien-21-oic acid, methyl ester (I) in 100 ml. of hot (60° C.) methanol was stirred with 2 g. of hydroxylamine hydrochloride and 2.5 g. of sodium acetate until a homogeneous mixture resulted. The mixture was allowed to stand for about 16 hours at room temperature and then poured into 400 ml. of crushed ice and water. After about 30 minutes the precipitated crude oxime was filtered and washed with water. The filter cake was then taken up in methylene chloride and washed successively with cold dilute (2%) hydrochloric acid and saturated sodium bicarbonate solutions. The extract was then dried over sodium sulfate and concentrated to nearly dryness by distillation in vacuo. The residue was taken up in 20 ml. of ethanol and diluted with 10 ml. of hot (70° C.) deionized water. The product crystallized on cooling and was filtered and dried in vacuo at about 80° C. for about 24 hours to yield 2.5 g. of 6α-methyl-3,11-dioxo-4,17(20)-cis-pregnadien-21-oic acid, methyl ester, 3-oxime (II) melting at 118 to 120° C.; λ max. 235 mμ; ε=24,400/C$_2$H$_5$OH; [α]$_D$+214° (CHCl$_3$).

Analysis.—Calc'd for C$_{23}$H$_{31}$NO$_4$ (percent): C, 71.66; H, 8.10; N, 3.63. Found (percent): C, 70.88; H, 8.15; N, 3.37.

The 3-anti form, 3-syn form and equilibrium mixture thereof of the thus produced 6α-methyl-3,11-dioxo-4,17(20)-cis pregnadien-21-oic acid, methyl ester, 3-oxime (II) are isolated and purified as recited in Example 1 for the aforesaid forms of the compound (II) prepared therein.,

EXAMPLE 6

11β-hydroxy-4,17(20)-cis-pregnadien-3-one-21-oic acid, methyl ester, 3-oxime (II)

A solution was prepared from 5 g. of 11β-hydroxy-4,17(20)-cis-pregnadien-3-one-21-oic acid, methyl ester (I) in 200 ml. of ethyl alcohol at 60° C. This solution was treated with 4 g. of hydroxylamine hydrochloride and 500 mg. of sodium acetate for about 5 hours at room temperature. The reaction mixture was poured into about 750 ml. of ice water and the material filtered, washed with hot (80° C.) deionized water and dried in vacuo at 40° C. to give 4.65 g. of crude product melting at 110 to 115° C. This material was taken up in 100 ml. of methylene chloride and mixed with 250 g. of silica gel. The solvent was removed by drying under vacuum at 40° C. and the product leeched from the silica gel with 1 l. of 20% methanol in methylene chloride. The extract was concentrated to dryness by vacuum distillation and the residue crystallized from aqueous ethanol to give 4.2 g. of 11β-hydroxy-4,17(20)-cis-pregnadien-3-one-21-oic acid, methyl ester, 3-oxime (II), having a melting point of 113 to 115° C., λ max. 234 mμ, ε=27,570/C$_2$H$_5$OH, [α]$_D$+221° (pyridine.)

Analysis.—Calc'd for C$_{22}$H$_{31}$NO$_4$·1/2H$_2$O (percent): C, 69.05; H, 8.45; N, 3.60. Found (percent): C, 69.21; H, 8.47; N, 3.89.

This material is converted to the corresponding anhydrous compound by heating at about 100° C. under high vacuum for a period of about 24 hours.

The 3-anti form, 3-syn form and equilibrium mixture thereof of the thus produced 11β-hydroxy-4,17(20)-cis-pregnadien-3-one-21-oic acid methyl ester, 3-oxime (11) are isolated and purified as recited in Example 1 for the aforesaid forms of the compound (II) prepared therein.

EXAMPLE 7

3,11-dioxo-4,17(20)-cis-pregnadien-21-oic acid, methyl ester, 3-oxime (II)

A solution was prepared from 200 g. of 3,11-dioxo-4,17(20)-cis-pregnadien-21-oic acid, methyl ester (I) in 600 ml. of ethanol (denatured with methanol) by warming to 60° C. To this solution, 100 g. of hydroxylamine hydrochloride and 20 g. of sodium acetate was added and the mixture stirred until completely homogeneous. The reaction mixture was allowed to stand at room temperature for about 20 hours. To determine whether the reaction had gone to completion, a thin layer chromatogram was prepared from a sample of the reaction mixture by spotting a silica gel plate with 1λ of material therefrom and developing it with 5% methanol in methylene chloride. The plate was sprayed with potassium permanganate-sodium periodate reagent to develop the spots. The starting material was spotted as a reference and the developed plate indicated that reaction was complete. The reaction mixture was poured into 10 l. of water and the precipitated product filtered by suction on a Buchner funnel. The filter cake was slurried with 3 l. of water and placed in an extraction vessel. It was extracted with 2 l. of methylene chloride and the extract washed twice with 1 l. portions of dilute hydrochloric acid (prepared by diluting 250 ml. of concentrated hydrochloric acid to a volume of 2 l.). The extract was then washed with 750 ml. of saturated sodium bicarbonate solution and dried over anhydrous sodium sulfate. The sodium sulfate was removed by filtration and the filtrate concentrated by vacuum distillation to a thick syrup. This residue was taken up in 2.5 l. of hot alcohol and diluted with 1 l. of hot (70° C.) deionized water. A first crop of the product crystallized on cooling and was collected by filtration on a Buchner funnel. The mother liquors were concentrated to a volume of 2 l. and a second crop of crystals recovered. Both crops, slightly colored, were redissolved in 4.7 l. of alcohol, heated, filtered and diluted with 2.35 l. of hot deionized water. The material crystallized on cooling and was allowed to stand at 0° to −5° C. for about 48 hours. The product was filtered and dried under vacuum at 80° C. for about 48 hours to constant weight to yield 149 g. of 3,11-dioxo-4,17(20)-cis-pregnadien-21-oic acid, methyl ester, 3-oxime (II), melting at 184 to 187° C.

*Analysis.*—Calc'd for $C_{22}H_{29}NO_4$ (percent): C, 71.13; H, 7.87; N, 3.77. Found (percent): C, 70.79; H, 7.79; N, 3.76.

The 3-anti form, 3-syn form and equilibrium mixture thereof of the thus produced 3,11-dioxo-4,17(20)-cis-pregnadien-21-oic acid, methyl ester, 3-oxime (II) are isolated and purified as recited in Example 1 for the aforesaid forms of the compound (II) prepared therein.

EXAMPLE 8

In this example certain of the new compounds of this invention are prepared by a process which is illustratively represented by the following reaction:

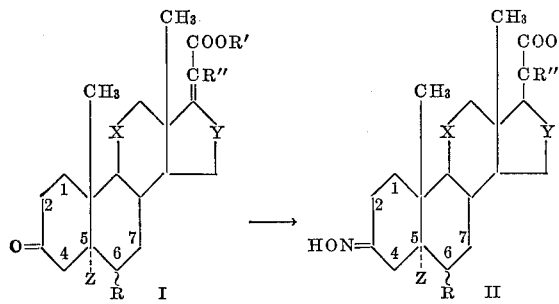

wherein 1(2), 4(5), 6(7), ~, R, R', R", X, Y and Z have the same meaning as on page 1.

Following the procedure of Examples 1 through 7, but substituting for the starting materials (I) employed therein, representative starting compounds (I) (prepared as in U.S. Pats. 3,281,485; 3,305,546; Netherlands patent application No. 6,614,662, filed Oct. 18, 1966) such as:

(1) methyl 9α-fluoro-3-keto-11β-hydroxy-4,17(20)-pregnadien-21-oate (I),
(2) methyl 2-methyl-3-keto-11β-hydroxy-1,4,17(20)-pregntrien-21-oate (I),
(3) methyl 4-methyl-3-keto-9α-fluoro-11β-hydroxy-4,17(20)-pregnadien-21-oate (I),
(4) methyl 6α-methyl-3,11-diketo-9α-chloro-4,17(20)-pregnadiene-21-oate (I),
(5) methyl 4-methyl-3-keto-4,9(11),17(20)-pregnatrien-21-oate (I),
(6) ethyl 2,6α-dimethyl-3-keto-9α-fluoro-11β-hydroxy-1,4,17(20)-pregnatrien-21-oate (I),
(7) methyl 3-keto-11α-hydroxy-5α-pregn-17(20)-en-21-oate (I),
(8) methyl 3-keto-5β-pregn-17(20)-en-21-oate (I),
(9) methyl 6,9α-difluoro-3-keto-11β-hydroxy-1,4,6,17(20)-pregnatetraen-21-oate (I),
(10) ethyl 2,6α-difluoro-3-keto-1,4,17(20)-pregnatrien-21-oate (I),
(11) methyl 7α-methyl-3-keto-4,17(20)-pregnadien-21-oate (I),
(12) methyl 2,9α-difluoro-3,11-diketo-1,4,17(20)-pregnatrien-21-oate (I),
(13) methyl 4-fluoro-2α,6α-dimethyl-3-keto-1,4,17(20)-pregnatrien-21-oate (I),
(14) methyl 2α,4,6α-trimethyl-3-keto-11β-hydroxy-4,17(20)-pregnadien-21-oate (I),
(15) methyl 6α,9α-difluoro-2,4-dimethyl-3-keto-11β-hydroxy-1,4,17(20)-pregnatrien-21-oate (I),
(16) methyl 3-oxo-4,17(20)-pregnadien-21-oate (I),
(17) methyl 5α-hydroxy-6β-methyl-3,11-diketo-17(20)-pregnen-21-oate (I),
(18) methyl 5α-hydroxy-6β-fluoro-3,11-diketo-17(20)-pregnen-21-oate (I),
(19) methyl 5α-hydroxy-6β-chloro-3,11-diketo-17(20)-pregnen-21-oate (I),
(20) methyl 16α-hydroxy-3,11-diketo-1,4,17(20)-pregnatrien-21-oate (I),
(21) methyl 16β-hydroxy-3,11-diketo-1,4,17(20)-pregnatrien-21-oate (I),
(22) methyl-16α-hydroxy-3,11-diketo-4,17(20)-pregnadien-21-oate (I),
(23) methyl-16β-hydroxy-3,11-diketo-4,17(20)-pregnadien-21-oate (I),
(24) methyl 5α,16β-dihydroxy-6β-methyl-3,11-diketo-17(20)-pregnen-21-oate (I),
(25) methyl 5α,16α-dihydroxy-6β-chloro-3,11-diketo-17(20)-pregnen-21-oate (I),
(26) methyl 3,11,16-triketo-1,4,17(20)-pregnatrien-21-oate (I),
(27) methyl 5α-hydroxy-6β-fluoro-3,11,16-triketo-17(20)-pregnen-21-oate (I),
(28) methyl 5α,16β-dihydroxy-6β-fluoro-3,11-diketo-17(20)-pregnen-21-oate (I),
(29) methyl 16β-hydroxy-3,11-diketo-1,4,17(20)-pregnatrien-21-oate (I),
(30) methyl 16β-fluoro-3,11-diketo-1,4,17(20)-pregnatrien-21-oate (I),
(31) methyl 16α-chloro-3,11-diketo-1,4,17(20)-pregnatrien-21-oate (I),
(32) methyl 6α,20-dimethyl-16β-hydroxy-3,11-diketo-4,17(20)-pregnadien-21-oate (I),
(33) methyl 6α-fluoro-3,11-diketo-16β-hydroxy-20-methyl-4,17(20)-pregnadien-21-oate (I),
(34) methyl 5α,16β-dihydroxy-6β,20-dimethyl-3,11-diketo-17(20)-pregnen-21-oate (I) and
(35) methyl 5α-11β,16β-trihydroxy-6β,20-dimethyl-3-keto-5α-pregn-17(20)en-21-oate (I), yields, respectively, (1) methyl 9α-fluoro-3-keto-11β-hydroxy-4,17(20)-pregnadien-21-oate, 3-oxime (II),
(2) methyl 2-methyl-3-keto-11β-hydroxy-1,4,17(20-pregnatrien-21-oate, 3-oxime (II),
(3) methyl 4-methyl-3-keto-9α-fluoro-11β-hydroxy-4,17(20)-pregnadien-21-oate, 3-oxime (II),
(4) methyl 6α-methyl-3,11-diketo-9α-chloro-4,17(20)-pregnadiene-21-oate, 3-oxime (II),
(5) methyl 4-methyl-3-keto-4,9(11),17(20)-pregnatrien-21-oate, 3-oxime (II),
(6) ethyl 2,6α-dimethyl-3-keto-9α-fluoro-11β-hydroxy-1,4,17(20)-pregnatrien-21-oate,3-oxime (II),
(7) methyl 3-keto-11α-hydroxy-5α-pregn-17(20)-en-21-oate, 3-oxime (II),
(8) methyl 3-keto-5β-pregn-17(20)-en-21-oate, 3-oxime (II),
(9) methyl 6,9α-difluoro-3-keto-11β-hydroxy-1,4,6,17(20)-pregnatetraen-21-oate, 3-oxime (II),
(10) ethyl 2,6α-difluoro-3-keto-1,4,17(20)-pregnatrien-21-oate, 3-oxime (II),
(11) methyl 7α-methyl-3-keto-4,17(20)-pregnadien-21-oate, 3-oxime (II),
(12) methyl 2,9α-difluoro-3,11-diketo-1,4,17(20)-pregnatrien-21-oate, 3-oxime (II),
(13) methyl 4-fluoro-2α,6α-dimethyl-3-keto-1,4,17(20)-pregnatrien-21-oate, 3-oxime (II),
(14) methyl 2α,4,6α-trimethyl-3-keto-11β-hydroxy-4,17(20)-pregnadien-21-oate, 3-oxime (II),
(15) methyl 6α,9α-difluoro-2,4-dimethyl-3-keto-11β-hydroxy-1,4,17(20)-pregnatrien-21-oate, 3-oxime (II),
(16) methyl 3-oxo-4,17(20)-pregnadien-21-oate, 3-oxime (II),
(17) methyl 5α-hydroxy-6β-methyl-3,11-diketo-17(20)-pregnen-21-oate, 3-oxime (II),
(18) methyl 5α-hydroxy-6β-fluoro 3,11-diketo-17(20)-pregnen-21-oate, 3-oxime (II),
(19) methyl 5α-hydroxy-6β-chloro-3,11-diketo-17(20)-pregnen-21-oate, 3-oxime (II),
(20) methyl 16α-hydroxy-3,11-diketo-1,4,17(20)-pregnatrien-21-oate, 3-oxime (II),
(21) methyl 16β-hydroxy-3,11-diketo-1,4,17(20)-pregnatrien-21-oate, 3-oxime (II),
(22) methyl-16α-hydroxy-3,11-diketo-4,17(20)-pregnadien-21-oate, 3-oxime (II),
(23) methyl-16β-hydroxy-3,11-diketo-4,17(20)-pregnadien-21-oate, 3-oxime (II),

(24) methyl 5α,16β-dihydroxy-6β-methyl-3,11-diketo-17(20)-pregnen-21-oate, 3-oxime (II),
(25) methyl 5α,16α-dihydroxy-6β-chloro-3,11-diketo-17(20)-pregnen-21-oate, 3-oxime (II),
(26) methyl 3,11,16-triketo-1,4,17(20)-pregnatrien-21-oate, 3-oxime (II),
(27) methyl 5α-hydroxy-6β-fluoro-3,11,16-triketo-17(20)-pregnen-21-oate, 3-oxime (II),
(28) methyl 5α,16β-dihydroxy-6β-fluoro-3,11-diketo-17(20)-pregnen-21-oate, 3-oxime (II),
(29) methyl 16β-hydroxy-3,11-diketo-1,4,17(20)-pregnatrien-21-oate, 3-oxime (II),
(30) methyl 16β-fluoro-3,11-diketo-1,4,17(20)-pregnatrien-21-oate, 3-oxime (II),
(31) methyl 16α-chloro-3,11-diketo-1,4,17(20)-pregnatrien-21-oate, 3-oxime (II),
(32) methyl 6α,20-dimethyl-16β-hydroxy-3,11-diketo-4,17(20)-pregnadien-21-oate, 3-oxime (II),
(33) methyl 6α-fluoro-3,11-diketo-16β-hydroxy-20-methyl-4,17(20)-pregnadien-21-oate, 3-oxime (II),
(34) methyl 5α,16β-dihydroxy-6β,20-dimethyl-3,11-diketo-17(20)-pregnen-21-oate, 3-oxime (II), and
(35) methyl 5α,11β,16β-trihydroxy-6β,20-dimethyl-3-keto-5α-pregn-17(20)-en-21-oate, 3-oxime (II).

The 3-anti form, 3-syn form and equilibrium mixture thereof of the thus produced 3-oximes (II) are isolated and purified as recited in Example 1 for the aforesaid forms of the compound (II) prepared therein.

EXAMPLE 9

5α,11β-dihydroxy-6β-methyl-5α-pregn-cis-17(20)-en-3-one 21-oic acid, methyl ester, 3-oxime (II)

One part of 5α - hydroxy-6β-methyl-3,11-dioxo-5α-pregn-cis-17(20)-en-21-oic acid, methyl ester 3 ethylene ketal (I), (prepared from the corresponding 3-ketone in the manner described in Example 1 of U.S. Pat. 2,707,184) and 1 part of sodium borohydride are dissolved in 20 parts of isopropyl alcohol and refluxed for about 6 hours. The mixture is cooled to about 10° C. and made just acid to test paper with dilute (about 5%) acetic acid. The mixture is partitioned between methylene chloride and water and the organic extract dried over anhydrous sodium sulfate. The dried extract is concentrated to a crystalline mass by vacuum distillation from a water bath kept at about 60° C. to yield 5α,11β-dihydroxy-6β-methyl-5α-pregn-cis-17(20)-en-3-one 21 oic acid, methyl ester, 3-ethylene ketal (I).

A solution of 0.5 g. of 5α,11β-dihydroxy-6β-methyl-5α-pregn-cis-17(20)-en-3-one 21-oic acid, methyl ester 3-ethylene ketal (I) in 35 ml. of acetone and 4 ml. of 1 N sulfuric acid solution is gently boiled on the steam bath for about 10 minutes, cooled and neutralized with dilute sodium bicarbonate solution. Addition of water and cooling gives 5α,11β - dihydroxy - 6β-methyl-5α-pregn-cis-17 (20)-en-3-one 21-oic acid, methyl ester (I).

A methanol solution of the thus produced 3-keton compound (I) is treated with hydroxylamine hydrochloride and pH 7 buffer solution (in the manner described in Examples 1 through 4, above) to yield 5α,11β-dihydroxy-6β-methyl-5α-pregn-cis-17(20)-en-3 - one 21 oic acid, methyl ester, 3-oxime (II).

Following the procedure of Example 9 but substituting for 5α - hydroxy - 6β - methyl-3,11-dioxo-5α-pregn-cis-17(20)-en-21-oic acid, methyl ester 3-ethylene ketal (I) other compounds such as the 3-ethylene ketals of (1) 6β-fluoro-5α,16α-dihydroxy-3,11-dioxo-5α-pregn-cis-17(20)-en-21-oic acid, methyl ester, (I)
(2) 5α,16α-dihydroxy-6β-methyl-3,11-dioxo-5α-pregn-cis-17(20)-en-21-oic acid, methyl ester (I),
(3) 5α,16β-dohydroxy-6β-methyl-3,11-dioxo-5α-pregn-17(20)-en-cis-20-carboxylic acid, methyl ester (I),
(4) 6α-methyl-3,11-diketo14,17(20)-cis-pregnadien-21-oic acid, methyl ester (I),
(5) 3,11-diketo-4,17(20)-cis-pregnadien-21-oic acid, methyl ester (I), yields, respectively, (1) 6β - fluoro - 5α,11β,16α-trihydroxy-5α-pregn-cis-17 (20) - en-3-one-21-oic acid, methyl ester, 3-oxime (II),
(2) 6β - methyl - 5α,11β,16α-trihydroxy-5α-pregn-cis-17 (20) - en-3-one-21-oic acid, methyl ester, 3-oxime (II),
(3) 6β - methyl - 5α,11β,16β - trihydroxy-5α-pregn-17 (20)-en-3-one-cis-20-carboxylic acid, methyl ester, 3-oxime (II),
(4) 6α - methyl - 11β-hydroxy-4,17(20)-cis-pregnadien-3-one-21-oic acid, methyl ester, 3-oxime (II) and
(5) 11β - hydroxy - 4,17(20)-cis-pregnadien-3-one-21-oic acid, methyl ester, 3-oxime (II).

The 3-anti form, 3-syn and equilibrium mixture thereof of the thus produced compounds (II) are isolated and purified as recited in Example 1 for the aforesaid forms of the compound (II) prepared therein.

EXAMPLE 10

6α-methyl-3,11-diketo-1,4,17(20)-cis-pregnatrien-21-oic acid, methyl ester, 3-oxime (II)

A mixture containing 650 mg. of 6α-methyl-3,11-diketo-4,17(20)-cis-pregnadien-21-oic acid, methyl ester (I), 30 ml. of dry benzene and 500 mg. of 2,3-dichloro-5,6-dicyanobenzoquinone (DDQ) is warmed at reflux for a period of about 12 hours. The reaction mixture is cooled and filtered. The filtrate is concentrated to about 10 ml., then slowly diluted with 20 ml. of water. The resulting precipitate is isolated by filtration. The precipitate is dissolved in 15 ml. of ethyl acetate, then washed successively with four 5 ml. portions of freshly prepared cold ammonium sulfide, dilute ammonium hydroxide, water, dilute hydrochloric acid and water. The solution is dried over sodium sulfate and evaporated to give a residue containing 6α-methyl-3,11-diketo 1,4,17(20)-cis-pregnatrien-21-oic acid, methyl ester (I). The residue is dissolved in 5 ml. of methylene chloride and 10 ml. of Skellysolve B. The solution is then chromatographed over a column containing 40 g. of Florisil. The column is eluted with Skellysolve B containing increasing proportions of acetone to give 6α-methyl-3,11-diketo-1,4,17(20)-cis-pregnatrien-21-oic acid, methyl ester (I), a light colored, crystalline solid which can be further purified by recrystallization from acetone-Skellysolve B mixtures.

A methanol solution of the thus produced $\Delta^{1,4}$-compound (I) is treated with hydroxylamine hydrochloride and pH 7 buffer solution (in the manner described in Examples 1 through 4, above) to yield 6α-methyl-3,11-diketo-1,4,17 (20)-cis-pregnatrien-21-oic acid, methyl ester, 3-oxime (II).

Following the procedures of Example 10 and the paragraph thereafter but employing the following starting materials:

(1) 11β - hydroxy - 4,17(20)-cis-pregnadien-3-one-21-oic acid, methyl ester, (I)
(2) 3,11 - diketo - 4,17(20)-cis-pregnadien-21-oic acid, methyl ester (I),
(3) 4 - methyl - 9α-fluoro-11β-hydroxy-4,17(20)-pregnadien-3-one-21-oic acid, methyl ester (I),
(4) 6α - methyl - 3,11-diketo-9α-chloro-4,17(20)-pregnadien-21-oic acid, methyl ester (I),
(5) 2α,6α - dimethyl - 11β-hydroxy-4,17(20)-pregnadien-3-one-21-oic acid, methyl ester (I),
(6) 7α - methyl - 4,17(20)-pregnadien-3-one-21-oic-acid, methyl ester (I),
(7) 6α,9α - difluoro - 11β-hydroxy-4,17(20)-pregnadien-3-one-21-oic acid, methyl ester (I),
(8) 6α - fluoro - 3,11-diketo-4,17(20)-pregnadien-21-oic acid, methyl ester (I),
(9) methyl 16α - hydroxy-3,11-diketo-4,17(20)-pregnadien-21-oate (I)
(10) methyl 16α - hydroxy - 6α-methyl-3,11-diketo-4,17 (20)-pregnadien-21-oate (I),

(11) 6α - fluoro-11β,16α-dihydroxy-4,17(20)-pregnadien-3-one-21-oic acid, methyl ester (I),
(12) 6α - methyl - 11β,16α-dihydroxy-4,17(20)-pregnadien-3-one-21-oic acid, methyl ester (I),
(13) 6α - fluoro - 3,11-dioxo-16β-hydroxy-20-methyl-4,17(20)-pregnadien-21-oic acid, methyl ester (I),
(14) 6α,20 - dimethyl - 16β-hydroxy-3,11-dioxo-4,17(20) pregnadien-21-oic acid, methyl ester (I) and
(15) 3,16 - dioxo - 11β - hydroxy-9α-fluoro-4,17(20)-pregnadien-21-oic acid, methyl ester (I), yields, respectively, (1) 11β - hydroxy - 1,4,17(20)-cis-pregnatrien-3-one-21-oic acid, methyl ester, 3-oxime (II),
(2) 3,11 - diketo - 1,4,17(20)-cis-pregnatrien-21-oic acid, methyl ester, 3-oxime (II),
(3) 4 - methyl - 9α - fluoro-11β-hydroxy-1,4,17(20)-pregnatrien-3-one-21-oic acid, methyl ester, 3-oxime (II),
(4) 6α - methyl - 3,11-diketo-9α-chloro-1,4,17(20)-pregnatrien-21-oic acid, methyl ester, 3-oxime (II),
(5) 2α,6α - dimethyl - 11β-hydroxy-1,4,17(20)-pregnatrien-3-one-21-oic acid, methyl ester, 3-oxime (II),
(6) 7α - methyl - 1,4,17(20) - pregnatrien-3-one-21-oic acid, methyl ester, 3-oxime (II),
(7) 6α,9α - difluoro - 11β-hydroxy-1,4,17(20)-pregnatrien-3-one-21-oic acid, methyl ester, 3-oxime (II),
(8) 6α-fluoro - 3,11-diketo-1,4,17(20)-pregnatrien-21-oic acid, methyl ester, 3-oxime (II),
(9) methyl 16α - hydroxy-3,11-diketo-1,4,17(20)-pregnatrien-21-oic acid, methyl ester, 3-oxime (II),
(10) methyl 16α - hydroxy - 6α-methyl-3,11-diketo-1,4,17(20)-pregnatrien-21-oate, 3-oxime (II),
(11) 6α - fluoro - 11β,16α-dihydroxy-1,4,17(20)-pregnatriene-3-one-21-oic acid, methyl ester, 3-oxime (II),
(12) 6α - methyl - 11β,16α-dihydroxy-1,4,17(20)-pregnatrien-3-one-21-oic acid, methyl ester, 3-oxime (II),
(13) 6α - fluoro-3,11 - dioxo-16β-hydroxy-20-methyl-1,4,17(20)-pregnatrien-21-oic acid, methyl ester, 3-oxime (II),
(14) 6α,20 - dimethyl-16β - hydroxy-3,11-dioxo-1,4,17(20)-pregnatrien-21-oic acid, methyl ester, 3-oxime (II) and
(15) 3,16 - dioxo-11β - hydroxy-9α-fluoro-1,4,17(20)-pregnatrien-21-oic acid, methyl ester, 3-oxime (II), The 3-anti form, 3-syn form and equilibrium mixture thereof of the thus produced compounds (II) are isolated and purified as recited in Example 1 for the aforesaid forms of the compound (II) prepared therein.

EXAMPLE 11

6α-methyl-3,11-diketo-4,6,17(20)-cis-pregnatrien-21-oic acid, methyl ester, 3-oxime (II)

A solution of 12 g. of 6α-methyl-3,11-diketo-4,17(20)-cis-pregnadien-21-oic acid, methyl ester (1) and 10 g. of chloranil tetrachloro-p-benzoquinone) in 500 ml. of tertiary amyl alcohol is refluxed for a period of about 4.5 hours. The tertiary amyl alcohol is then distilled under vacuum in a nitrogen atmosphere. The residue is dissolved in methylene chloride and then shaken with dilute sodium hydroxide. The precipitate that forms is separated by filtration through diatomaceous earth. The organic phase of the filtrate is separated and washed with dilute sodium hydroxide, water and then dried. The solvent is distilled leaving a residue (crude and crystalline) which after purification by chromatography through a Florisil column and crystallization gives 6α-methyl-3,11-diketo-4,6,17(20)-cis-pregnatrien-21-oic acid, methyl ester (I).

A methanol solution of the thus produced Δ$^{4,6}$-compound (I) is treated with hydroxylamine hydrochloride and pH 7 buffer solution (in the manner described in Examples 1 through 4, above) to yield 6α-methyl-3,11-diketo - 4,6,17(20) - cis-pregnatrien-21-oic acid, methyl ester, 3-oxime (II).

Following the procedure of Example 11 and the paragraph thereafter but substituting as starting materials the following compounds:

(1) 11β-hydroxy-4,17(20)-cis-pregnadien-3-one-21-oic acid, methyl ester (I),
(2) 3,11-diketo-4,17(20)-cis-pregnadien-21-oic acid, methyl ester (I),
(3) 6α-methyl-3,11-diketo-9α-chloro-4,17(20)-pregnadien-21-oic acid, methyl ester (I),
(4) 7α-methyl-4,17(20)-pregnadien-3-one, 21-oic acid, methyl ester (1),
(5) 6α,9α-difluoro-11β-hydroxy-4,17(20)-pregnadien-3-one-21-oic acid, methyl ester (I),
(6) methyl 16α-hydroxy-6α-methyl-3,11-diketo-4,17(20)-pregnadien-21-oate (I),
(7) 6α-fluoro-11β,16α-dihydroxy-4,17(20)-pregnadien-3-one-21-oic acid, methyl ester (I),
(8) 6α-fluoro-3,11-dioxo-16β-hydroxy-20-methyl-4,17(20)-pregnadien-21-oic acid, methyl ester (I) and
(9) 3,16-dioxo-11β-hydroxy-9α-fluoro-4,17(20)-pregnadien-21-oic acid, methyl ester (I), yields, respectively, (1) 11β-hydroxy-4,6,17(20)-cis-pregnatrien-3-one-21-oic acid, methyl ester, 3-oxime (II),
(2) 3,11-diketo-4,6,17(20)-cis-pregnatrien-21-oic acid, methyl ester, 3-oxime (II),
(3) 6-methyl-3,11-diketo-9α-chloro-4,6,17(20)-pregnatrien-21-oic acid, methyl ester, 3-oxime (II),
(4) 7α-methyl-4,6,17(20)-pregnatrien-3-one, 21-oic acid, methyl ester, 3-oxime (II),
(5) 6,9α-difluoro-11β-hydroxy-4,6,17(20)-pregnatrien-3-one-21-oic acid, methyl ester, 3-oxime (II),
(6) methyl 16α-hydroxy-6α-methyl-3,11-diketo-4,6,17(20)-pregnatrien-21-oate, 3-oxime (II),
(7) 6-fluoro-11β,16α-dihydroxy-4,6,1720)-pregnatrien-3-one-21-oic acid, methyl ester, 3-oxime (II),
(8) 6-fluoro-3,11-dioxo-16β-hydroxy-20-methyl-4,6,17(20)-pregnatrien-21-oic acid, methyl ester, 3-oxime (II) and
(9) 3,16-dioxo-11β-hydroxy-9α-fluoro-4,6,17(20)-pregnatrien-21-oic acid, methyl ester, 3-oxime (II).

The 3-anti form, 3-syn form and equilibrium mixture thereof of the thus produced compounds (II) are isolated and purified as recited in Example 1 for the aforesaid forms of the compound (II) prepared therein.

EXAMPLE 12

6α-methyl-3,11-diketo-1,4,6,17(20)-cis-pregnatetraen-21-oic acid, methyl ester, 3-oxime (II)

A mixture containing 650 mg. of 6α-methyl-3,11-diketo-4,6,17(20)-cis-pregnatrien-21-oic acid, methyl ester (I), 30 ml. of dry benzene and 500 mg. of tetrachloro-p-benzoquinone (chloranil) is warmed at reflux for about 12 hours. The reaction mixture is cooled and filtered. The filtrate is concentrated to about 10 ml., then slowly diluted with 20 ml. of water. The resulting precipitate is isolated by filtration. The preripitate is dissolved in 15 ml. of ethyl acetate, then washed with four 5 ml. portions of freshly prepared cold ammonium sulfide, dilute ammonium hydroxide, water, dilute hydrochloric acid and water. The solution is dried over sodium sulfate and evaporated to give a residue containing 6-methyl-3,11-diketo - 1,4,6,17(20) - cis-pregnatetraen-21-oic acid, methyl ester (I). The residue is dissolved in 5 ml. of methylene chloride and 10 ml. of Skellysolve B. The solution is then chromatographed over a column containing 40 g. of Florisil. The column is eluted with increasing proportions of acetone in Skellysolve B to give 6-methyl 3,11-diketo - 1,4,6,17(20) - cis-pregnatetraen-21-oic acid, methyl ester (I), a crystalline solid, which can be further purified by recrystallization from acetone-Skellysolve B mixtures.

A methanol solution of the thus produced $\Delta^{1,4,6}$-compound (I) is treated with hydroxylamine hydrochloride and pH 7 buffer solution (in the manner described in Examples 1 through 4, above) to yield 6-methyl-3,11-diketo-1,4,6,17(20)-cis-pregnatetraen-21-oic acid, methyl ester, 3-oxime (II).

Following the procedure of Example 12 and the paragraph thereafter but substituting as starting material the following compounds:

(1) 3,11-diketo-4,6,17(20)-cis-pregnatrien-3-one, 21-oic acid, methyl ester (I),
(2) 4-methyl-9α-fluoro-11β-hydroxy-4,6,17(20)-pregnatrien-3-one-21-oic acid, methyl ester (I),
(3) 2α-6-difluoro-11β-hydroxy-4,6,17(20)-pregnatrien-3-one-21-oic acid, methyl ester (I),
(4) methyl 16α-hydroxy-6-methyl-3,11-diketo-4,6,17-(20)-pregnatrien (I) and
(5) 6,20-dimethyl-16β-hydroxy-3,11-diketo-4,6,17(20)-pregnatrien-21-oic acid, methyl ester (I), yields, respectively, (1) 3,11-diketo-1,4,6,17(20)-cis-pregnatetraen-3-one, 21-oic acid, methyl ester, 3-oxime (II),
(2) 4-methyl-9α-fluoro-11β-hydroxy-1,4,6,17(20)-pregnatetraen-3-one-21-oic acid, methyl ester, 3-oxime (II),
(3) 2α,6-difluoro-11β-hydroxy-1,4,6,17(20) - pregnatetraen-3-one-21-oic acid, methyl ester, 3-oxime (II),
(4) methyl 16α-hydroxy-6-methyl - 3,11 - diketo-1,4,6,17 (20)-pregnatetraen, 3-oxime (II) and
(5) 6,20-dimethyl-16β-hydroxy-3,11-diketo-1,4,6,17(20)-pregnatetraen-21-oic acid, methyl ester, 3-oxime (II).

The 3-anti form, 3-syn form and equilibrium mixture thereof of the thus produced compounds (II) are isolated and purified as recited in Example 1 for the aforesaid forms of the compound (II) prepared therein.

EXAMPLE 13

6-methyl-3,11-diketo-1,4,6,17(20)-cis-pregnatetraen-21-oic acid, methyl ester, 3-oxime (II)

A solution of 12 g. of 6α-methyl-3,11-diketo-1,4,6,17 (20)-cis-pregnatrien-21-oic acid, methyl ester (I) and 10 g. of chloranil in 500 ml. of tertiary amyl alcohol is refluxed for a period of about 4.5 hours. The tertiary amyl alcohol is then distilled off under vacuum in a nitrogen atmosphere. The residue is dissolved in methylene chloride and then shaken with dilute sodium hydroxide. The precipitate that forms is separated by filtration through diatomaceous earth. The organic phase of the filtrate is separated, washed first with dilute sodium hydroxide solution, then water and dried. The solvent is distilled off leaving a residue of crystalline 6-methyl-3,11-diketo-1,4,6,17(20)-cis-pregnatetraen-21-oic acid, methyl ester (I).

A methanol solution of the thus produced $\Delta^{1,4,6}$-compound (I) is treated with hydroxylamine hydrochloride and pH 7 buffer solution (in the manner described in Example 1 through 4, above) to yield 6α-methyl-3,11-diketo-1,4,6,17(20)-cis-pregnatetraen-21-oic acid, methyl ester, 3-oxime (II).

Following the procedure of Example 13 and the paragraph thereafter but substituting for 6α-methyl-3,11-diketo - 1,4,17(20) - cis - pregnatrien - 21-oic acid, methyl ester, (I), another starting material such as:

(1) 11β - hydroxy - 1,4,17(20)-cis-pregnatrien-3-one-21-oic acid, methyl ester (I),
(2) 7α - methyl-1,4,17(20)-pregnatrien-3-one-21-oic acid, methyl ester (I),
(3) 6α-methyl-3,11-diketo-9α-fluoro-1,4,17(20) - pregnatrien-21-oic acid, methyl ester (I),
(4) 6α-fluoro-11β,16β-dihydroxy-20-methyl - 1,4,17(20)-pregnatrien-3-one-21-oic acid, methyl ester (I) and
(5) 3,16-dioxo-9α-fluoro-11β-hydroxy-1,4,17(20)-pregnatrien-21-oic acid, methyl ester (I), yields, respectively, (1) 11β-hydroxy-1,4,6,17(20) - cis-pregnatetraen-3-one-21-oic acid, methyl ester, 3-oxime (II),
(2) 7α-methyl-1,4,6,17(20) - pregnatetraen-3-one-21-oic acid, methyl ester, 3-oxime (II),
(3) 6-methyl-3,11-diketo-9α-fluoro - 1,4,6,17(20)-pregnatetraen-21-oic acid, methyl ester, 3-oxime (II),
(4) 6-fluoro-11β,16β-dihydroxy-20-methyl - 1,4,6,17(20)-pregnatetraen-3-one-21-oic acid, methyl ester, 3-oxime (II) and
(5) 3,16-dioxo-9α-fluoro-11β-hydroxy-1,4,6,17(20)-pregnatetraen-21-oic acid, methyl ester, 3-oxime (II).

The 3-anti form, 3-syn form and equilibrium mixture thereof of the thus produced compounds (II) are isolated and purified as recited in Example 1 for the aforesaid forms of the compound (II) prepared therein.

EXAMPLE 14

3,11-diketo-4,17(20)-cis-pregnadien-21-oic acid, 3-oxime (II)

A solution of 2.5 g. of 3,11-diketo-4,17(20)-cis pregnadien-21-oic acid, methyl ester (I) in 75 ml. of methanol is refluxed under nitrogen atmosphere for about 20 hours with a solution of 2.5 g. of potassium hydroxide in 15 ml. of water. The mixture is then diluted with 200 ml. of water and extracted with methylene chloride to remove any unhydrolyzed ester (V). The aqueous mixture is made acid with ice cold dilute hydrochloric acid. The steroid is extracted with methylene chloride and the extract washed with water until the washings become neutral to test paper. The extract is dried over anhydrous sodium sulfate and concentrated to dryness by distillation in vacuo. The residue is crystallized from ether to give pure 3,11-diketo-4,17(20)-cis-pregnadien-21-oic acid (I).

A solution of 2.0 g. of 3,11-diketo-4,17(20)-cis-pregnadien-21-oic acid in 60 ml. of methanol is treated with 1.6 g. of hydroxylamine hydrochloride and 0.4 g. of sodium acetate and is stirred for about 48 hours at room temperature. Most of the methanol is then removed by evaporation under reduced pressure, and the residue is diluted with about 50 ml. of water and made acid with 2 ml. of 3 N hydrochloric acid, resulting in precipitation of the product. The product, 3,11-diketo-4,17(20)-cis-pregnadien-21-oic acid 3-oxime, is separated by filtration, washed with water, and dried under reduced pressure.

Following the procedure of Example 14 and the following paragraph but substituting for 3,11-diketo-4,17 (20)-cis-pregnadien-21-oic acid, methyl ester (I) other starting materials such as:

(1) 5α-hydroxy-6β-methyl-3,11-dioxo-5α-pregn - cis - 17 (20)-en-21-oic acid, methyl ester (I),
(2) 6β-fluoro-5α,16α-dihydroxy-3,11-dioxo-5α-pregn - cis - 17(20)-en-21-oic acid, methyl ester (I),
(3) 5α,16α-dihydroxy-6β-methyl-3,11 - dioxo - 5α-pregn-cis-17(20)-en-21-oic acid, methly ester (I),
(4) 5α,16β-dihydroxy-6β-methyl-3,11-dioxo-5α - pregn-17 (20)-en-cis-20-carboxylic acid, methyl ester (I),
(5) 6α-methyl-3,11-diketo - 4,17(20)-cis-pregnadien - 21-oic acid, methyl ester (I),
(6) 11β-hydroxy-4,17(20)-cis-pregnadien-3-one - 21 - oic acid, methyl ester (I),
(7) methyl 3-keto-11α - hydroxy-5α-pregn-17(20)-en-21-oate (I),
(8) methyl 6α-methyl-11β,16β-dihydroxy-4,17(20)-pregnadien-3-one-21-oate (II),
(9) 6β-fluoro-11β,16α-dihydroxy-4,17(20)-pregnadien - 3-one-21-oic acid methyl ester (I) and
(10) methyl 7α-methyl-3-keto-1,4,17(20)-pregnatrien-21-oate (I), yields, respectively, (1) 5α - hydroxy-6β-methyl-3,11-dioxo-5α-pregn-cis - 17(20)-en-21-oic acid, 3-oxime (II)
(2) 6β-fluoro-5α,16α-dihydroxy-3,11-dioxo - 5α - pregn-cis-17(20)-en-21-oic acid, 3-oxime (II),
(3) 5α,16α-dihydroxy-6β-methyl-3,11-dioxo - 5α - pregn-cis-17(20)-en-21-oic acid, 3-oxime (II),
(4) 5α,16β-dihydroxy-6β-methyl-3,11-dioxo - 5α - pregn-17(20)-en-cis-20-carboxylic acid, 3-oxime (II),
(5) 6α - methyl-3,11-diketo-4,17(20)-cis-pregnadien - 21-oic acid, 3-oxime (II),
(6) 11β-hydroxy-4,17(20)-cis-pregnadien-3-one - 21 - oic acid, 3-oxime (II),
(7) 3-keto-11α-hydroxy-5α-pregn - 17(20)-en-21-oic acid 3-oxime (II),
(8) 6α,20-dimethyl-11β,16β-dihydroxy - 4,17(20) - pregnadien-3-one-21-oic acid, 3-oxime (II),
(9) 6β-fluoro-11β,16α-dihydroxy-4,17(20)-pregnadien - 3-one-21-oic acid, 3-oxime (II) and
(10) 7α-methyl-3-keto-1,4,17(20)-pregnatrien-21-oic acid, 3-oxime (II).

The 3-anti form, the 3-syn form and the equilibrium mixture thereof of the thus produced compounds (II) are isolated and purified as recited in Example 1 for the aforesaid forms of the compound (II) prepared therein.

We claim:
1. 3,11 - dioxo - 4,17(20) - cis-pregnadien-21-oic acid, methyl ester, 3-oxime.

References Cited
UNITED STATES PATENTS

| 2,153,700 | 4/1939 | Serini et al. | 260—397.3 |
| 3,169,132 | 2/1965 | BirKenmeyer et al. | 260—397.3 |
| 3,281,415 | 10/1966 | Schneider et al. | 260—239.55 |
| 3,305,546 | 2/1967 | Pike | 260—239.55 |

FOREIGN PATENTS 6,614,662   4/1967   Netherlands.

LEWIS GOTTS, Primary Examiner

E. G. LOVE, Assistant Examiner

U.S. Cl. X.R.

260—239.55; 424—238